US012769820B2

(12) United States Patent
Kim et al.

(10) Patent No.: US 12,769,820 B2
(45) Date of Patent: Oct. 20, 2026

(54) METHOD, SYSTEM AND NON-TRANSITORY COMPUTER-READABLE RECORDING MEDIUM FOR MANAGING BIO-SIGNAL DATA

(71) Applicant: HUINNO, CO., LTD., Seoul (KR)

(72) Inventors: Joo Min Kim, Seoul (KR); Sung Hoon Jung, Seoul (KR)

(73) Assignee: HUINNO, CO., LTD., Seoul (KR)

(*) Notice: Subject to any disclaimer, the term of this patent is extended or adjusted under 35 U.S.C. 154(b) by 331 days.

(21) Appl. No.: 18/449,531

(22) Filed: Aug. 14, 2023

(65) Prior Publication Data

US 2023/0385402 A1 Nov. 30, 2023

Related U.S. Application Data

(63) Continuation of application No. PCT/KR2022/001077, filed on Jan. 20, 2022.

(30) Foreign Application Priority Data

Feb. 15, 2021 (KR) ........................ 10-2021-0020162

(51) Int. Cl.

*G06F 21/62* (2013.01)
*G06F 21/32* (2013.01)
*G06F 21/44* (2013.01)
*H04L 29/06* (2006.01)

(52) U.S. Cl.

CPC ............ *G06F 21/445* (2013.01); *G06F 21/32* (2013.01)

(58) Field of Classification Search

CPC ........ G06F 21/445; G06F 21/32; G06F 21/60; G06F 21/62; H04L 9/08

See application file for complete search history.

(56) References Cited

U.S. PATENT DOCUMENTS

2022/0014503 A1* 1/2022 Boutros .............. G06F 21/6218

FOREIGN PATENT DOCUMENTS

| | | | | |
|---|---|---|---|---|
| JP | 2007075372 A * | 3/2007 | ............ | H04L 29/02 |
| KR | 10-1498974 B1 | 3/2015 | | |
| KR | 10-2018-0081108 A | 7/2018 | | |
| KR | 10-2008101 B1 | 8/2019 | | |
| KR | 10-2019-0122655 A | 10/2019 | | |

(Continued)

OTHER PUBLICATIONS

Kogure, Susumu; "Biological Signal Monitoring Device"; English Translation of Written Description for JP-2007075372-A; Publication Date: Mar. 29, 2007; pp. 1-10 (Year: 2007).*

(Continued)

*Primary Examiner* — Fatoumata Traore
*Assistant Examiner* — Courtney D Fields
(74) *Attorney, Agent, or Firm* — United One Law Group LLC; Kongsik Kim; Jhongwoo Peck

(57) ABSTRACT

A method for managing biosignal data is provided. The method includes the steps of: generating an encryption key for encrypting biosignal data associated with a second device, with reference to first public information determined on the basis of secret information of a first device, and secret information of the second device; and providing second public information determined on the basis of the secret information of the second device, and the biosignal data encrypted on the basis of the encryption key to the first device.

21 Claims, 4 Drawing Sheets

(56) References Cited

FOREIGN PATENT DOCUMENTS

| | | | | | |
|---|---|---|---|---|---|
| KR | 102079626 | B1 * | 4/2020 | ......... | H04L 63/0861 |
| KR | 10-2021-0000884 | A | 1/2021 | | |
| WO | WO-2020061593 | A1 * | 3/2020 | ......... | H04L 63/0442 |

OTHER PUBLICATIONS

Yoon, Eun Jun, Park, Yun Ha; "System for Hiding Information Using Lightweight Mutual Authentication Based on Biometric in Mobile Environment,"; English Translation of Written Description for KR-102079626-B1; Publication Date: Apr. 7, 2020; pp. 1-48 (Year: 2020).*

Mona M. Elamir, Mai S. Mabrouk, Walid I. Al-Atabany; "An E-health System for Encrypting Biosignals Using Triple-DES and Hash Function"; 2021 3rd Novel Intelligent and Leading Emerging Sciences Conference (NILES); Year: 2021 | Conference Paper | Publisher: IEEE; pp. 11-14 (Year: 2021).*

International Search Report for parent application PCT/KR2022/001077, dated May 17, 2022.

* cited by examiner

METHOD, SYSTEM AND NON-TRANSITORY COMPUTER-READABLE RECORDING MEDIUM FOR MANAGING BIO-SIGNAL DATA

CROSS-REFERENCE TO RELATED APPLICATION(S)

This application is a Continuation of International Application No. PCT/KR2022/001077 filed on Jan. 20, 2022, which claims priority from Korean Patent Application No. 10-2021-0020162 filed on Feb. 15, 2021. The aforementioned applications are incorporated herein by reference in their entireties.

TECHNICAL FIELD

The present invention relates to a method, system, and non-transitory computer-readable recording medium for managing biosignal data.

RELATED ART

In recent years, smart devices have emerged that allow users to easily and conveniently measure a biosignal such as an electrocardiogram at home without visiting hospitals, and even diagnose heart abnormality such as arrhythmia on the basis of the biosignal.

As an example of related conventional techniques, Korean Laid-Open Patent Publication No. 2021-884 discloses a biosignal measurement device, comprising: at least one brain wave measurement sensor for measuring a brain wave signal of a user in contact with the user's head, and a Bluetooth module for receiving the brain wave signal measured by the brain wave measurement sensor and transmitting it to a predetermined terminal, and receiving a sound source transmitted from the terminal.

However, according to the techniques introduced so far as well as the above-described conventional technique, the transmission and reception of biosignal data measured from a user are performed without separately processing the biosignal data, resulting in a security problem that when using an unsecured wired path or passing through other devices in the course of the transmission and reception, the biosignal data is bound to be exposed in the event of interception or leakage.

In particular, most devices for measuring or monitoring biosignal data are constrained by low power and only support low-speed wireless communication (e.g., Bluetooth Low Energy (BLE)) in many cases. When extracting the biosignal data from the devices using the low-speed wireless communication, the extraction takes a very long time due to the constraints of wireless communication speed. For this reason, a wired path is often used for fast extraction; however, in this case, the transmission and reception without any separate processing as described above are vulnerable in terms of security, and thus new techniques are needed to enhance data security.

In this connection, the inventor(s) present a novel and inventive technique for securely managing biosignal data by exchanging information necessary for encryption and decryption between a first device and a second device, and performing encryption and decryption of the biosignal data on the basis of the information.

SUMMARY

One object of the present invention is to solve all the above-described problems in the prior art.

Another object of the invention is to securely exchange keys without exposure by employing a key exchange method (specifically, a symmetric key exchange method) for generating an encryption key in a second device with reference to first public information determined on the basis of secret information of a first device, and secret information of the second device, and generating a decryption key in the first device with reference to second public information determined on the basis of the secret information of the second device, and the secret information of the first device.

Yet another object of the invention is to encrypt and transmit biosignal data so that the biosignal data may be securely protected even if it is leaked or intercepted in the course of the transmission.

Still another object of the invention is to enhance security by ensuring that secret information of a first device is specified on the basis of identification information of a second device.

The representative configurations of the invention to achieve the above objects are described below.

According to one aspect of the invention, there is provided a method for managing biosignal data, the method comprising the steps of: generating an encryption key for encrypting biosignal data associated with a second device, with reference to first public information determined on the basis of secret information of a first device, and secret information of the second device; and providing second public information determined on the basis of the secret information of the second device, and the biosignal data encrypted on the basis of the encryption key to the first device.

According to another aspect of the invention, there is provided a method for managing biosignal data, the method comprising the steps of: acquiring biosignal data encrypted on the basis of an encryption key of a second device, and second public information determined on the basis of secret information of the second device; and generating a decryption key for decrypting the encrypted biosignal data with reference to the second public information and secret information of a first device, wherein the encryption key is generated with reference to first public information determined on the basis of the secret information of the first device, and the secret information of the second device.

According to yet another aspect of the invention, there is provided a system for managing biosignal data, the system comprising: a key management unit configured to generate an encryption key for encrypting biosignal data associated with a second device, with reference to first public information determined on the basis of secret information of a first device, and secret information of the second device; and an information management unit configured to provide second public information determined on the basis of the secret information of the second device, and the biosignal data encrypted on the basis of the encryption key to the first device.

According to still another aspect of the invention, there is provided a system for managing biosignal data, the system comprising: an information management unit configured to acquire biosignal data encrypted on the basis of an encryption key of a second device, and second public information determined on the basis of secret information of the second device; and a key management unit configured to generate a decryption key for decrypting the encrypted biosignal data with reference to the second public information and secret information of a first device, wherein the encryption key is generated with reference to first public information determined on the basis of the secret information of the first device, and the secret information of the second device.

In addition, there are further provided other methods and systems to implement the invention, as well as non-transitory computer-readable recording media having stored thereon computer programs for executing the methods.

According to the invention, it is possible to securely exchange keys without exposure by employing a key exchange method (specifically, a symmetric key exchange method) for generating an encryption key in a second device with reference to first public information determined on the basis of secret information of a first device, and secret information of the second device, and generating a decryption key in the first device with reference to second public information determined on the basis of the secret information of the second device, and the secret information of the first device.

According to the invention, it is possible to encrypt and transmit biosignal data so that the biosignal data may be securely protected even if it is leaked or intercepted in the course of the transmission.

According to the invention, it is possible to enhance security by ensuring that secret information of a first device is specified on the basis of identification information of a second device.

DETAILED DESCRIPTION

Figure 1:
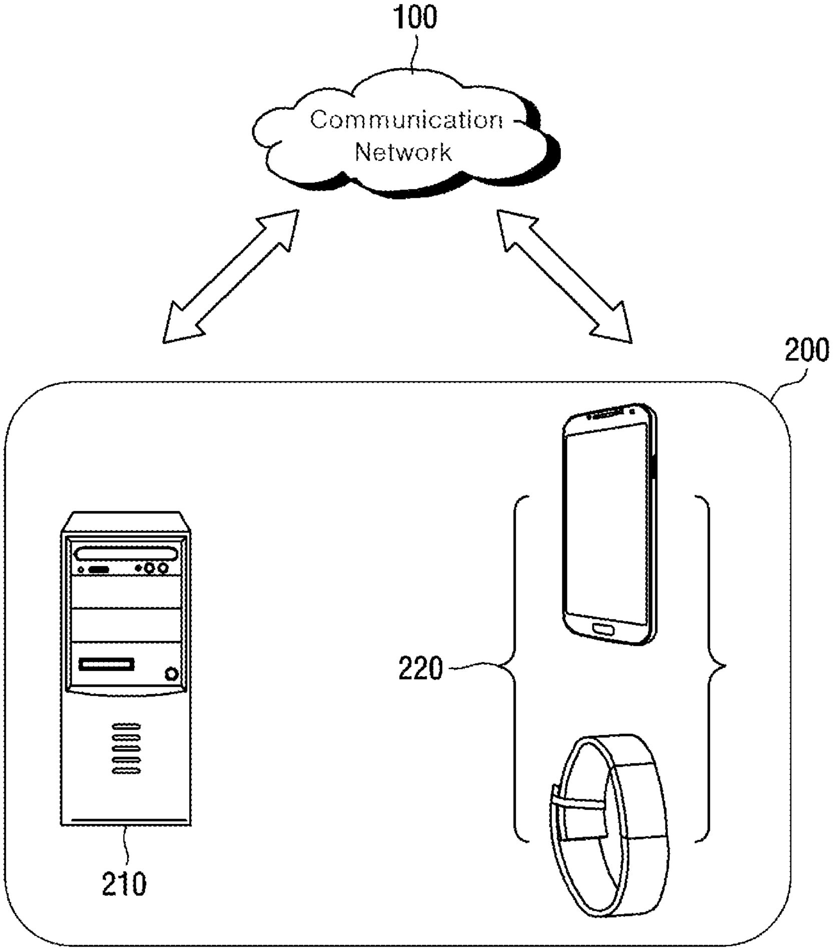
FIG. 1 schematically shows the configuration of an entire system for managing biosignal data according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Configuration of the Entire System

FIG. 1 schematically shows the configuration of the entire system for managing biosignal data according to one embodiment of the invention.

As shown in FIG. 1, the entire system according to one embodiment of the invention may comprise a communication network 100 and a plurality of devices 200.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the plurality of devices 200 according to one embodiment of the invention are digital equipment that may function to communicate with other devices 200 via the communication network 100, and any type of digital equipment having a memory means and a microprocessor for computing capabilities, such as a computer, a laptop, a smart phone, a tablet PC, a smart watch, a smart patch, and a server, may be adopted as the devices 200 according to the invention.

Meanwhile, the plurality of devices 200 according to one embodiment of the invention may include a biosignal data management system for supporting management (specifically, encryption and decryption) of biosignal data according to the invention in the form of a program module such as an application or a widget. Further, the program module may be downloaded from an external application distribution server (not shown), an external system (not shown), or the like.

The biosignal data management system according to one embodiment of the invention may function to generate an encryption key for encrypting biosignal data associated with a second device 220, with reference to first public information determined on the basis of secret information of a first device 210, and secret information of the second device 220, and to provide second public information determined on the basis of the secret information of the second device 220, and the biosignal data encrypted on the basis of the encryption key to the first device 210. Further, the biosignal data management system according to one embodiment of the invention may function to acquire biosignal data encrypted on the basis of an encryption key of the second device 220, and second public information determined on the basis of secret information of the second device 220, and to generate a decryption key for decrypting the encrypted biosignal data with reference to the second public information and secret information of the first device 210.

Here, the biosignal data may include a variety of biosignal data such as an electrocardiogram, heart rate, brain wave, and pulse. However, the biosignal data according to the invention is not necessarily limited only to those listed above, and may be diversely expanded as long as the objects of the invention may be achieved.

The configuration and functions of the biosignal data management system according to the invention will be discussed in detail below. Meanwhile, the above description is illustrative although the biosignal data management system has been described as above, and it is noted that at least a part of the functions or components required for the biosignal data management system may be implemented or included in the plurality of devices 200 (e.g., the first device 210 and the second device 220) or an external system (not shown), as necessary. Meanwhile, the plurality of devices 200 according to one embodiment of the invention may serve as the biosignal data management system according to the invention. For example, the second device 220 according to one embodiment of the invention may function to generate an encryption key for encrypting biosignal data associated with the second device 220, with reference to first public information determined on the basis of secret information of the first device 210, and secret information of the second device 220, and to provide second public information determined on the basis of the secret information of the second device 220, and the biosignal data encrypted on the basis of the encryption key to the first device 210. Further, the first device 210 according to one embodiment of the invention may function to acquire biosignal data encrypted on the basis of an encryption key of the second device 220, and second public information determined on the basis of secret information of the second device 220, and to generate a decryption key for decrypting the encrypted biosignal data with reference to the second public information and secret information of the first device 210.

Meanwhile, in some cases, the plurality of devices 200 according to one embodiment of the invention (e.g., the second device 220) may further include a measurement sensor for acquiring a biosignal from a user's body (e.g., an electrocardiogram sensor, an electromyogram sensor, a heart rate sensor, a brainwave sensor, or a pulse sensor). Meanwhile, such a measurement sensor may be included in another device (e.g., a wearable device to be described below) interworking with any one of the plurality of devices 200 via the communication network 100.

Configuration of the Biosignal Data Management System

Hereinafter, the internal configuration of the biosignal data management system crucial for implementing the invention and the functions of the respective components thereof will be discussed.

The biosignal data management system according to one embodiment of the invention may comprise a key management unit and an information management unit. According to one embodiment of the invention, at least some of the key management unit and the information management unit may be program modules that communicate with an external system. The program modules may be included in the biosignal data management system in the form of operating systems, application program modules, and other program modules, while they may be physically stored in a variety of commonly known storage devices. Further, the program modules may also be stored in a remote storage device that may communicate with the biosignal data management system. Meanwhile, such program modules may include, but are not limited to, routines, subroutines, programs, objects, components, and data structures for performing specific tasks or executing specific abstract data types according to the invention as will be described below.

First, the key management unit according to one embodiment of the invention may function to generate an encryption key for encrypting biosignal data associated with the second device 220, with reference to first public information determined on the basis of secret information of the first device 210, and secret information of the second device 220. The secret information according to one embodiment of the invention may be specified on the basis of at least one of arbitrary numbers, letters, and symbols, and may be, for example, randomly sampled numbers, i.e., random numbers. Further, the first public information according to one embodiment of the invention is information that is provided publicly to the second device 220 (specifically, publicly to other devices including the second device 220) in order for the first device 210 and the second device 220 to exchange information on keys used for encryption and decryption (i.e., encryption keys and decryption keys). For example, assuming that the secret information of the first device 210 is A (where A is any number between 1 and P-2, and P may be a prime number), the first public information discussed above may include the prime numbers P and G (where G may be a primitive root of P) and $G^{\wedge}(A) \bmod P$ generated on the basis thereof. The first public information according to one embodiment of the invention may be pre-stored in the second device 220 (e.g., pre-stored during the course of production, manufacture, or sale of the second device 220), or may be provided from the first device 210 to the second device 220 in advance (e.g., provided prior to encryption key generation). Meanwhile, the secret information and the public information may be at least partially similar to secret information and public information defined in a Diffie-Hellman key exchange method or an elliptic-curve Diffie-Hellman key exchange method.

For example, assuming that the secret information of the first device 210 is A and the secret information of the second device 220 is B (where A and B are any numbers between 1 and P-2, and P may be a prime number), the key management unit may calculate the first public information (i.e., the prime numbers P and G, and $G^{\wedge}(A) \bmod P$ generated using the prime numbers) generated on the basis of the secret information of the first device 210 (i.e., A), and the secret information of the second device 220 (i.e., B), thereby generating an encryption key (i.e., $G^{\wedge}(B*A) \bmod P$) for encrypting biosignal data associated with the second device 220.

Meanwhile, the secret information of the first device 210 discussed above may be determined with reference to identification information of the second device 220. The identification information according to one embodiment of the invention is unique information that allows the devices 200 to be distinguished from one another, and may include, for example, a serial number, a product number, a MAC address, or the like that is assigned to each device 200.

For example, the secret information of the first device 210 may be A1 (where A1 may be any number) when the identification information of the second device 220 is SN #1, and may be A2 (where A2 may be any number) when the identification information of the second device 220 is SN*2. That is, the secret information of the first device 210 may change according to the identification number of the respective second device 220. The secret information of the first device 210 corresponding to the identification information of the second device 220 may be specified with reference to a lookup table for the secret information of the first device 210 corresponding to the identification information of each of the plurality of second devices 220.

Further, the key management unit according to one embodiment of the invention may generate a decryption key for decrypting the encrypted biosignal data with reference to second public information determined on the basis of the secret information of the second device 220, and the secret information of the first device 210. The secret information according to one embodiment of the invention may be specified on the basis of at least one of arbitrary numbers, letters, and symbols, and may be, for example, randomly sampled numbers, i.e., random numbers. Further, the second public information according to one embodiment of the invention is information that is provided publicly to the first device 210 (specifically, publicly to other devices including the first device 210) in order for the first device 210 and the second device 220 to exchange information on keys used for encryption and decryption (i.e., encryption keys and decryption keys). For example, assuming that the secret information of the second device 220 is B (where B is any number between 1 and P-2, and P may be a prime number), the second public information may include G^(B) mod P generated on the basis of the prime numbers P and G (where G may be a primitive root of P). In addition, the second public information may further include the prime numbers P and G.

For example, assuming that the secret information of the second device 220 is B and the secret information of the first device 210 is A (where A and B are any numbers between 1 and P-2, and P may be a prime number), the key management unit may calculate the second public information (i.e., G^(B) mod P) generated on the basis of the secret information of the second device 220 (i.e., B), and the secret information of the first device 210 (i.e., A), thereby generating a decryption key (i.e., G^(A*B) mod P).

Meanwhile, although a Diffie-Hellman key exchange method may be employed to exchange encryption keys and decryption keys according to the invention, it is noted that the key exchange method according to the invention is not necessarily limited to the above method, and various key exchange methods (e.g., symmetric key exchange methods) such as an elliptic-curve Diffie-Hellman key exchange method may be employed as long as the objects of the invention may be achieved.

Next, the information management unit may function to provide second public information determined on the basis of the secret information of the second device 220, and the biosignal data encrypted on the basis of the encryption key generated by the key management unit to the first device 210.

For example, the information management unit may encrypt biosignal data measured for a predetermined reference time (e.g., at a one-minute interval) on the basis of an encryption key (e.g., G^(A*B) mod P) generated by the key management unit, and transmit the encrypted biosignal data and second public information (e.g., G^(B) mod P) determined on the basis of the secret information of the second device 220 (e.g., B) to the first device 210 at a predetermined interval. That is, problems such as overload of the communication network 100 and excessive occupation of bandwidth may be prevented by packaging biosignal data with respect to a predetermined time and providing the packaged biosignal data to the first device 210 intermittently. Meanwhile, in this case, the secret information of the second device 220 may change at a predetermined interval, and the second public information determined on the basis of the changed secret information of the second device 220 and the encrypted biosignal data may be transmitted to the first device 210.

As another example, upon detection of the occurrence of biosignal data that meets a predetermined reference condition (e.g., biosignal data from which health abnormality is estimated), the information management unit may encrypt the biosignal data (e.g., biosignal data that is specified with respect to a time point at which health abnormality is estimated to occur) on the basis of an encryption key generated by the key management unit, and transmit the encrypted biosignal data and second public information determined on the basis of the secret information of the second device 220 to the first device 210.

Meanwhile, various encryption methods such as a cipher block chaining (CBC) mode, a cipher feedback (CFB) mode, and a counter (CTR) mode may be employed to encrypt the biosignal data on the basis of the encryption key according to the invention. However, it is noted that the encryption method according to the invention is not necessarily limited to the block ciphers listed above, and may be diversely changed as long as the objects of the invention may be achieved.

Further, the information management unit may function to acquire the biosignal data encrypted on the basis of the encryption key of the second device 220 and the second public information determined on the basis of the secret information of the second device 220.

For example, the encrypted biosignal data and the second public information may be provided from the second device 220 to a device interworking with the second device 220 (specifically, a device that extracts the biosignal data from the second device 220 in a wired or wireless manner) (a device for extracting biosignal data in a wired manner is often utilized because the second device 220 only supports low-speed wireless communication due to the constraints of low power in many cases), and the information management unit may acquire the encrypted biosignal data and the second public information from the device interworking with the second device 220.

Figure 2:
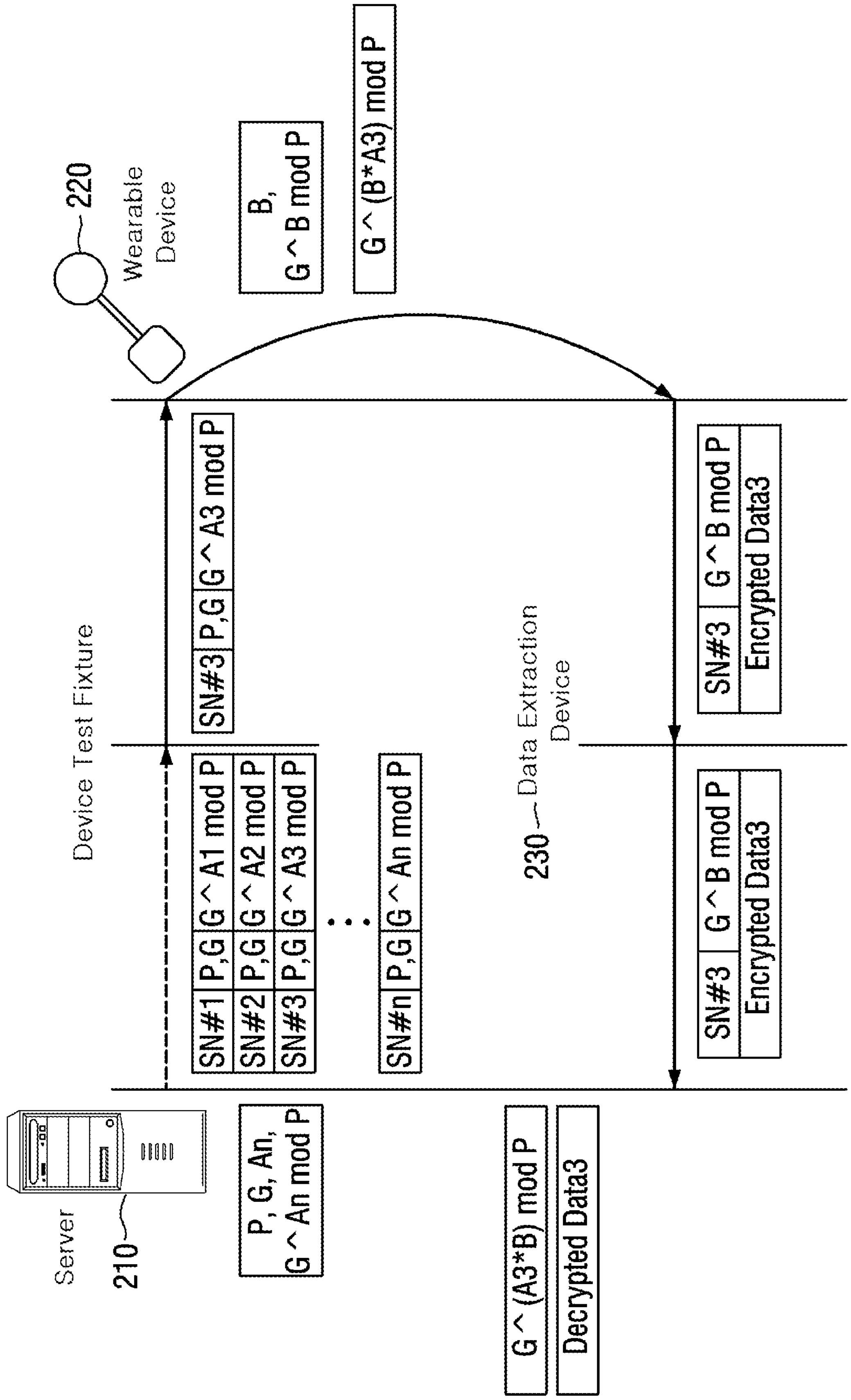
FIG. 2 illustratively shows a process of managing biosignal data according to one embodiment of the invention.
Figure 3:
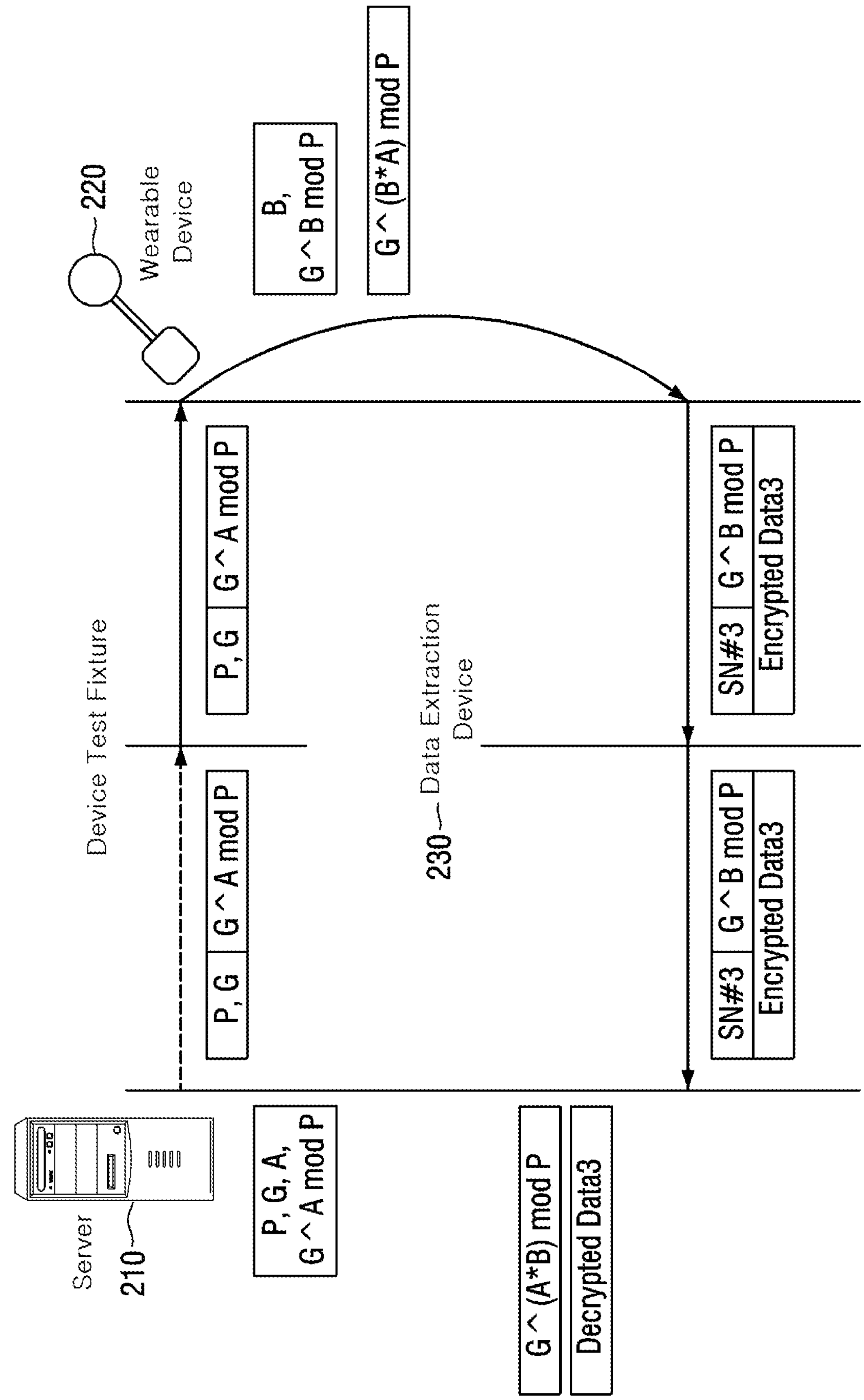
FIG. 3 illustratively shows a process of managing biosignal data according to one embodiment of the invention.
Figure 4:
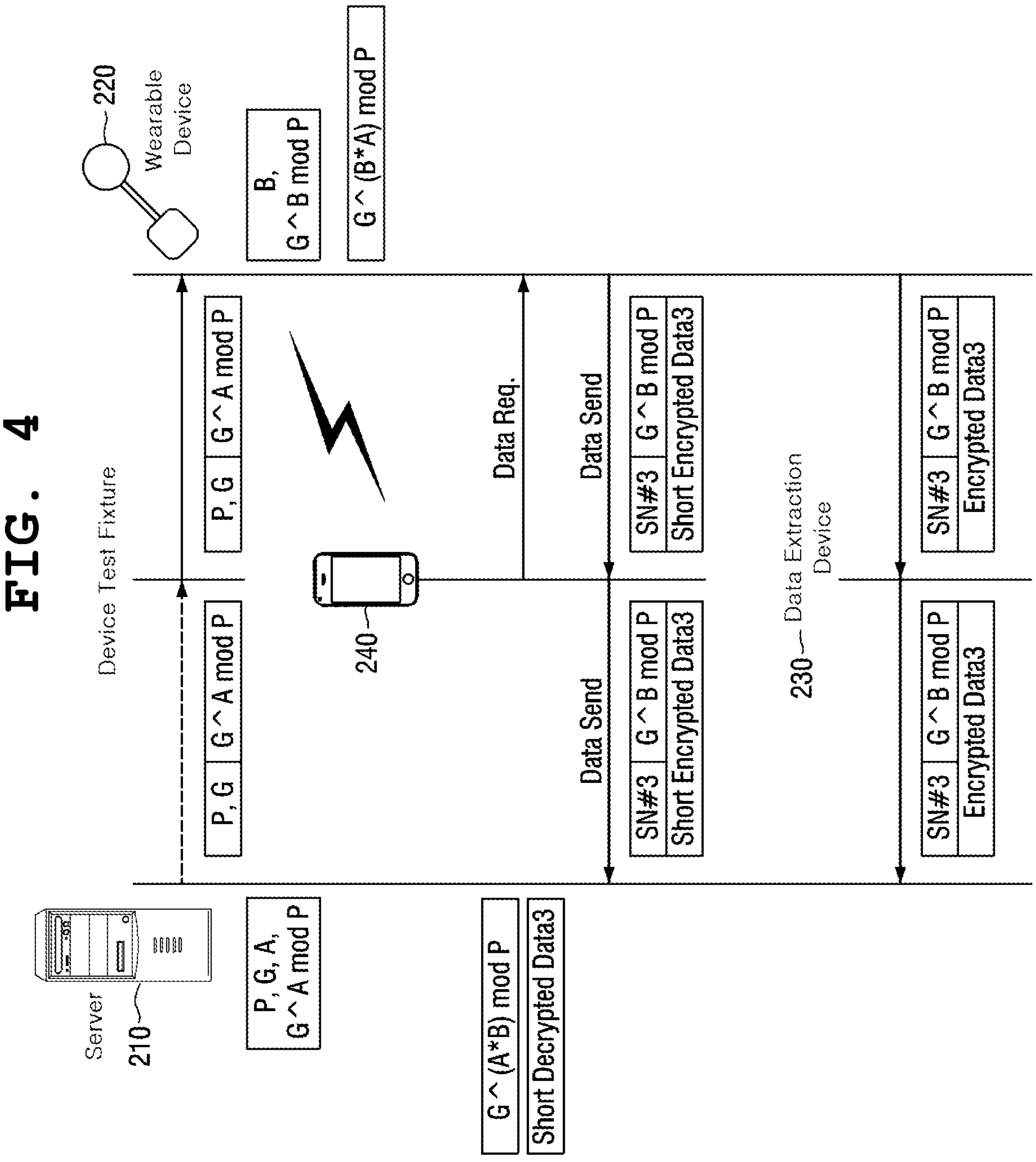
FIG. 4 illustratively shows a process of managing biosignal data according to one embodiment of the invention.

FIGS. 2 to 4 illustratively show processes of managing biosignal data according to one embodiment of the invention.

Hereinafter, it may be assumed that the plurality of devices 200 (e.g., a server 210, a wearable device 220, a wired data extraction device 230, and a wireless data extraction device 240) include at least a part of the key management unit and the information management unit of the biosignal data management system according to the invention, or that the plurality of devices 200 serve as the biosignal data management system (or any one of the key management unit and the information management unit of the biosignal data management system). Here, the server 210 may function to store or analyze biosignal data of the wearable device 220 (i.e., a device 220 that measures a biosignal from a user's body and is operated with low power), the wired data extraction device 230 may function to extract biosignal data from the wearable device 220 via a wired transmission/reception path at a high speed and provide the biosignal data to the server 210, and the wireless data extraction device 240 may function to extract biosignal data from the wearable device 220 via a wireless transmission/reception path (e.g., low-speed wireless communication such as Bluetooth Low Energy (BLE), Zigbee, or LoRa) at a low speed and provide the biosignal data to the server 210. Further, the server 210, the wired data extraction device 230, and the wireless data extraction device 240 may communicate with each other via the communication network 100 (specifically, a high-speed communication network).

Referring to FIG. 2, according to one embodiment of the invention, the wearable device (i.e., second device) 220 that acquires biosignal data from the user's body may be provided with first public information corresponding to identification information of the wearable device 220 in advance (i.e., prior to encryption key generation). Specifically, the first public information may include prime numbers P and G (where G may be a primitive root of P) and G^(A3) mod P, which is generated on the basis of the prime numbers P and G and secret information of the server (i.e., first device) 210 (e.g., A3) (where A3 may be any number between 1 and P-2) corresponding to an identification number SN*3 of the wearable device 220. The first public information specific to the wearable device 220 (e.g., which may be specified by the server 210) may optionally be provided to the wearable device 220 by a device test fixture at the time of production of the wearable device 220.

First, according to one embodiment of the invention, an encryption key for encrypting biosignal data associated with the wearable device 220 may be generated with reference to the first public information determined on the basis of the secret information of the server 210 (i.e., A3), and secret information of the wearable device 220 (e.g., B) (where B may be any number between 1 and P-2). More specifically, an encryption key for encrypting biosignal data associated with the wearable device 220 (i.e., G^(B*A3) mod P) may be generated by calculating the first public information (i.e., G^(A3) mod P) stored in the wearable device 220 and the secret information of the wearable device 220 (i.e., B).

Then, according to one embodiment of the invention, biosignal data measured by the wearable device 220 may be encrypted by the wearable device 220 on the basis of the encryption key (i.e., G^(B*A3) mod P). That is, the biosignal data measured by the wearable device 220 may be encrypted and stored in the wearable device 220.

Then, according to one embodiment of the invention, the wired data extraction device 230 may extract the second public information (i.e., G^(B) mod P) determined on the basis of the secret information of the wearable device 220 (i.e., B), and the biosignal data encrypted on the basis of the encryption key (i.e., G^(B*A3) mod P) from the wearable device 220, and may provide the second public information (i.e., G^(B) mod P) and the encrypted biosignal data extracted as above to the server 210. Here, the second public information may further include identification information of the wearable device 220 (i.e., information on SN*3).

Then, according to one embodiment of the invention, the server 210 may specify secret information corresponding to the wearable device 220 (i.e., A3) from among a plurality of pieces of secret information (i.e., A1 to An) on the basis of the identification information of the wearable device 220 (i.e., SN*3) (e.g., with reference to a lookup table for a plurality of pieces of secret information corresponding to identification information of a plurality of wearable devices 220), and may generate a decryption key for decrypting the encrypted biosignal data with reference to the second public information and the secret information corresponding to the wearable device 220 on the server 210. More specifically, a decryption key (i.e., G^(A3*B) mod P) for decrypting the encrypted biosignal data may be generated by calculating the second public information (i.e., G^(B) mod P) and the secret information of the server 210 (i.e., A3). That is, the encryption key and the decryption key may be identically generated.

Then, according to one embodiment of the invention, the server 210 may decrypt the encrypted biosignal data on the basis of the decryption key (i.e., G^(A3*B) mod P).

Next, referring to FIG. 3, according to one embodiment of the invention, the wearable device (i.e., second device) 220 that acquires biosignal data from the user's body may be provided with first public information corresponding to identification information of the wearable device 220 in advance. Specifically, the first public information may include prime numbers P and G (where G may be a primitive root of P) and G^(A) mod P, which is generated on the basis of the prime numbers P and G and secret information of the server (i.e., first device) 210 (e.g., A) (where A may be any number between 1 and P-2) that is specified to be identical regardless of an identification number of the wearable device 220 (e.g., the first public information of the wearable device 220 determined on the basis of the secret information of the server 210 may be identical to first public information of another wearable device 220 determined on the basis of the secret information of the server 210). The first public information specific to the wearable device 220 (e.g., which may be specified by the server 210) may optionally be provided to the wearable device 220 by a device test fixture at the time of production of the wearable device 220. Meanwhile, since the first public information is identical regardless of the identification number of the wearable device 220, the first public information may be fixed in firmware or the like of the wearable device 220 without employing the device test fixture.

First, according to one embodiment of the invention, an encryption key (i.e., G^(A) mod P) for encrypting biosignal data associated with the wearable device 220 may be generated with reference to the first public information (i.e., the prime numbers P and G and G^(A) mod P) determined on the basis of the secret information of the server 210 (i.e., A), and secret information of the wearable device 220 (e.g., B) (where B may be any number between 1 and P-2).

Then, according to one embodiment of the invention, biosignal data measured by the wearable device 220 may be encrypted by the wearable device 220 on the basis of the encryption key (i.e., G^(B*A) mod P). That is, the biosignal data measured by the wearable device 220 may be encrypted and stored in the wearable device 220.

Then, according to one embodiment of the invention, the wired data extraction device 230 may extract the second public information (i.e., G^(B) mod P) determined on the basis of the secret information of the wearable device 220 (i.e., B), and the biosignal data encrypted on the basis of the encryption key (i.e., G^(B*A) mod P) from the wearable device 220, and may provide the second public information (i.e., G^(B) mod P) and the encrypted biosignal data extracted as above to the server 210.

Then, according to one embodiment of the invention, the server 210 may generate a decryption key (i.e., G^(A*B) mod P) for decrypting the encrypted biosignal data by calculating the second public information (i.e., G^(B) mod P) and the secret information of the server 210 (i.e., A). That is, the encryption key and the decryption key may be identically generated.

Then, according to one embodiment of the invention, the server 210 may decrypt the encrypted biosignal data on the basis of the decryption key (i.e., G^(A*B) mod P).

Although the cases where the wired data extraction device 230 extracts the encrypted biosignal data and the second public information in a wired manner and provides them to the server 210 have been mainly described above with reference to FIGS. 2 and 3, a situation will be discussed below in which the wireless data extraction device 240 (e.g., a smart phone) extracts the encrypted biosignal data and the second public information in a wireless manner in real time or at a predetermined interval and provides them to the server 210. Meanwhile, since the biosignal data may merely be extracted at a low speed as discussed above (specifically, only low-speed wireless communication is available due to the constraints of low power), a wireless transmission/reception path may be employed to convey biosignal data that is not greater than a predetermined length (or size) or is measured or monitored for a period not greater than a predetermined level (e.g., for one minute).

Referring to FIG. 4, according to one embodiment of the invention, the wearable device (i.e., second device) 220 that acquires biosignal data from the user's body may be provided with first public information corresponding to identification information of the wearable device 220 in advance. Specifically, the first public information may include prime numbers P and G (where G may be a primitive root of P) and G^(A) mod P, which is generated on the basis of the prime numbers P and G and secret information of the server (i.e., first device) 210 (e.g., A) (where A may be any number between 1 and P-2). The first public information specific to the wearable device 220 (e.g., which may be specified by the server 210) may optionally be provided to the wearable device 220 by a device test fixture at the time of production of the wearable device 220. Meanwhile, since the first public information is identical regardless of an identification number of the wearable device 220, the first public information may be fixed in firmware or the like of the wearable device 220 without employing the device test fixture.

First, according to one embodiment of the invention, an encryption key (i.e., G^(A) mod P) for encrypting biosignal data associated with the wearable device 220 may be generated with reference to the first public information (i.e., G^(A) mod P) determined on the basis of the secret information of the server 210 (i.e., A), and secret information of the wearable device 220 (e.g., B) (where B may be any number between 1 and P-2).

Then, according to one embodiment of the invention, upon detection of biosignal data from which health abnormality is estimated, the wearable device 220 may encrypt the biosignal data (e.g., biosignal data for a period predetermined with respect to a time point at which health abnormality is estimated to occur) on the basis of the encryption key (i.e., G^(B*A) mod P).

Then, according to one embodiment of the invention, the wireless data extraction device 240 may extract the encrypted biosignal data and the second public information (i.e., G^(B) mod P) determined on the basis of the secret information of the wearable device 220 (i.e., B) from the wearable device 220, and may provide the encrypted biosignal data and the second public information (i.e., G^(B) mod P) extracted as above to the server 210 in real time.

Meanwhile, according to one embodiment of the invention, when a request for transmission of biosignal data of a particular time point is generated, the wireless data extraction device 240 may extract the encrypted biosignal data of the particular time point and the second public information (i.e., G^(B) mod P) determined on the basis of the secret information of the wearable device 220 (i.e., B) from the wearable device 220, and may provide the encrypted biosignal data of the particular time point and the second public information (i.e., G^(B) mod P) extracted as above to the server 210.

Then, according to one embodiment of the invention, the server 210 may generate a decryption key (i.e., G^(A*B) mod P) for decrypting the encrypted biosignal data with reference to the second public information (i.e., G^(B) mod P) and the secret information of the server 210 (i.e., A).

Then, according to one embodiment of the invention, the server 210 may decrypt the encrypted biosignal data on the basis of the decryption key (i.e., G^(A*B) mod P).

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for managing biosignal data, the method comprising the steps of:

generating, by a second device, an encryption key for encrypting biosignal data associated with the second device, with reference to first public information determined on the basis of secret information of a first device, and secret information of the second device;

generating, by the second device, second public information on the basis of the secret information of the second device;

generating, by the second device, encrypted biosignal data by encrypting the biosignal data on the basis of the encryption key; and transmitting, from the second device to the first device, the second public information and the encrypted biosignal data, wherein the encryption key is generated by performing an operation on the first public information and the secret information of the second device, and wherein the first public information is generated on the basis of the secret information of the first device, a first prime number, and a second prime number that is a primitive root of the first prime number.

2. The method of claim 1, wherein the secret information of the first device is specified with reference to identification information of the second device.

3. The method of claim 1, wherein the first public information is pre-stored in the second device or provided from the first device to the second device.

4. The method of claim 1, wherein the first public information of the second device determined on the basis of the secret information of the first device is identical to first public information of another second device determined on the basis of the secret information of the first device.

5. The method of claim 1, wherein in the providing step, the second public information and biosignal data for a predetermined reference time encrypted on the basis of the encryption key are provided to the first device at a predetermined interval.

6. The method of claim 1, wherein in the providing step, upon detection of biosignal data that meets a predetermined condition, the second public information and encrypted biosignal data, which is specified on the basis of the encryption key and the detected biosignal data, are provided to the first device.

7. A method for managing biosignal data, the method comprising the steps of:

receiving, by a first device from a second device, biosignal data encrypted on the basis of an encryption key of the second device, and second public information determined on the basis of secret information of the second device;

generating, by the first device, a decryption key for decrypting the encrypted biosignal data with reference to the second public information and secret information of the first device; and generating, by the first device, decrypted biosignal data by decrypting the encrypted biosignal data on the basis of the decryption key, wherein the encryption key is generated with reference to first public information determined on the basis of the secret information of the first device, and the secret information of the second device, wherein the decryption key is generated by performing an operation on the second public information and the secret information of the first device, and wherein the second public information is generated on the basis of the secret information of the second device, a first prime number, and a second prime number that is a primitive root of the first prime number.

8. The method of claim 7, wherein the secret information of the first device is specified with reference to identification information of the second device.

9. The method of claim 7, wherein the first public information is pre-stored in the second device or provided from the first device to the second device.

10. The method of claim 7, wherein the first public information of the second device determined on the basis of the secret information of the first device is identical to first public information of another second device determined on the basis of the secret information of the first device.

11. A non-transitory computer-readable recording medium having stored thereon a computer program configured to be executed by a processor, the computer program when executed by the processor configured to:

generate, by a second device, an encryption key for encrypting biosignal data associated with the second device, with reference to first public information determined on the basis of secret information of a first device, and secret information of the second device;

generate, by the second device, second public information on the basis of the secret information of the second device;

generate, by the second device, encrypted biosignal data by encrypting the biosignal data on the basis of the encryption key; and transmit, from the second device to the first device, the second public information and the encrypted biosignal, wherein the encryption key is generated by performing an operation on the first public information and the secret information of the second device, and wherein the first public information is generated on the basis of the secret information of the first device, a first prime number, and a second prime number that is a primitive root of the first prime number.

12. A system for managing biosignal data, the system comprising one or more processors configured to:

generate, by a second device, an encryption key for encrypting biosignal data associated with the second device, with reference to first public information determined on the basis of secret information of a first device, and secret information of the second device;

generate, by the second device, second public information on the basis of the secret information of the second device;

generate, by the second device, encrypted biosignal data by encrypting the biosignal data on the basis of the encryption key; and transmit, from the second device to the first device, the second public information and the encrypted biosignal data, wherein the one or more processors are configured to generate the encryption key by performing an operation on the first public information and the secret information of the second device, and wherein the first public information is generated on the basis of the secret information of the first device, a first prime number, and a second prime number that is a primitive root of the first prime number.

13. The system of claim 12, wherein the secret information of the first device is specified with reference to identification information of the second device.

14. The system of claim 12, wherein the first public information is pre-stored in the second device or provided from the first device to the second device.

15. The system of claim 12, wherein the first public information of the second device determined on the basis of the secret information of the first device is identical to first public information of another second device determined on the basis of the secret information of the first device.

16. The system of claim 12, wherein the one or more processors are configured to provide the second public information and biosignal data for a predetermined reference time encrypted on the basis of the encryption key to the first device at a predetermined interval.

17. The system of claim 12, wherein the one or more processors are configured to, upon detection of biosignal data that meets a predetermined condition, provide the second public information and encrypted biosignal data, which is specified on the basis of the encryption key and the detected biosignal data, to the first device.

18. A system for managing biosignal data, the system comprising one or more processors configured to:

receive, by a first device from a second device, biosignal data encrypted on the basis of an encryption key of the second device, and second public information determined on the basis of secret information of the second device;

generate, by the first device, a decryption key for decrypting the encrypted biosignal data with reference to the second public information and secret information of the first device; and generate, by the first device, decrypted biosignal data by decrypting the encrypted biosignal data on the basis of the decryption key, wherein the encryption key is generated with reference to first public information determined on the basis of the secret information of the first device, and the secret information of the second device, wherein the one or more processors are configured to generate the decryption key by performing an operation on the second public information and the secret information of the first device, and wherein the second public information is generated on the basis of the secret information of the second device, a first prime number, and a second prime number that is a primitive root of the first prime number.

19. The system of claim 18, wherein the secret information of the first device is specified with reference to identification information of the second device.

20. The system of claim 18, wherein the first public information is pre-stored in the second device or provided from the first device to the second device.

21. The system of claim 18, wherein the first public information of the second device determined on the basis of the secret information of the first device is identical to first public information of another second device determined on the basis of the secret information of the first device.

* * * * *